United States Patent
Chen et al.

(10) Patent No.: US 11,523,440 B2
(45) Date of Patent: Dec. 6, 2022

(54) RANDOM ACCESS METHOD AND TERMINAL

(71) Applicant: DATANG MOBILE COMMUNICATIONS EQUIPMENT CO., LTD., Beijing (CN)

(72) Inventors: Li Chen, Beijing (CN); Pierre Bertrand, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/258,101

(22) PCT Filed: Jul. 3, 2019

(86) PCT No.: PCT/CN2019/094547
§ 371 (c)(1),
(2) Date: Jan. 5, 2021

(87) PCT Pub. No.: WO2020/007316
PCT Pub. Date: Jan. 9, 2020

(65) Prior Publication Data
US 2021/0251017 A1    Aug. 12, 2021

(30) Foreign Application Priority Data

Jul. 6, 2018  (CN) .......................... 201810739005.4

(51) Int. Cl.
*H04W 74/08* (2009.01)
*H04W 72/04* (2009.01)
(Continued)

(52) U.S. Cl.
CPC ...... *H04W 74/0841* (2013.01); *H04B 7/0695* (2013.01); *H04W 72/0453* (2013.01); *H04W 72/0493* (2013.01); *H04W 76/19* (2018.02)

(58) Field of Classification Search
CPC ............ H04W 74/0841; H04W 76/19; H04W 72/0453; H04W 72/0493; H04B 7/0695
See application file for complete search history.

(56) References Cited

U.S. PATENT DOCUMENTS

| 2014/0029455 A1 | 1/2014 | Vitthaladevuni et al. |
| 2021/0058837 A1* | 2/2021 | Cirik ................. H04W 72/0453 |
| 2021/0105776 A1* | 4/2021 | Jiang ................. H04W 72/0453 |

FOREIGN PATENT DOCUMENTS

| CN | 104488305 A | 4/2015 |
| WO | 2018121621 A1 | 7/2018 |

OTHER PUBLICATIONS

3GPP TS 38.321 v15.2.0 (Jun. 2018), 3rd Generation Partnership Project; Technical Specification Group Radio Access Network; NR; Medium Access Control (MAC) protocol specification (Release 15), pp. 1-73. (Year: 2018).*

(Continued)

*Primary Examiner* — Melvin C Marcelo
(74) *Attorney, Agent, or Firm* — Ladas & Parry, LLP (57) ABSTRACT

The present disclosure provides a random access method and a terminal. The method of the present disclosure includes: when non-contention random access is initiated and current uplink and downlink Band Width Parts BWPs are inconsistent with uplink and downlink BWPs configured by a base station for non-contention random access, setting, by the terminal, active BWPs as an uplink BWP and a downlink BWP having the same number, and performing contention random access on the active BWPs; or setting, by the terminal, the active BWPs as the uplink BWP and the downlink BWP configured by the base station for non-contention random access, and performing the non-contention random access on the active BWPs.

12 Claims, 2 Drawing Sheets

(51) Int. Cl.
*H04B 7/06* (2006.01)
*H04W 76/19* (2018.01)

(56) References Cited

OTHER PUBLICATIONS

R2-1809515, 'Further issues with DL BWP switching for CFRA', CATT, 3GPP TSG-RAN WG2 AH-1807, Jul. 2-6, 2018, pp. 1-6. (Year: 2018).*
R2-1806991, 'Further issues with switching of bandwidth part and random access', CATT, 3GPP TSG-RAN WG2#102, May 21-25, 2018, pp. 1-6. (Year: 2018).*
MediaTek Inc., "On remaining issues of RACH procedure," 3GPP TSG RAN WG1 Meeting #93, R1-1807417, Busan, Korea, May 21 to 25, 2018.
LG Electronics Inc., "BWP switching for RACH," 3GPP TSG-RAN WG2 NR AH, R2-1801246, Vancouver, Canada, Jan. 22 to Jan. 26, 2018.
Ericsson, "BWP selection and RA," 3GPP TSG-RAN WG2 #101, Tdoc R2-1803203, Athens, Greece, Feb. 26, 2018 to Mar. 2, 2018.
International Search Report issued with respect to International Application No. PCT/CN2019/094547 dated Oct. 9, 2019.
Written Opinion issued with respect to International Application No. PCT/CN2019/094547 dated Oct. 9, 2019.
Extended European Search Report from corresponding EP app. No. 19831030.2, dated Aug. 16, 2021, all pages.
First Office Action and Search Report from corresponding CN app. No. 201810739005.4, dated Aug. 4, 2021 with English translation provided by Global Dossier, all pages.
"Corrections to BWP Operation", R1-1807270, 3GPP TSG RAN WG1 Meeting #93, Busan, Korea, May 21-25, 2018, all pages.
"The impact of BWP configuration and switching", R2-1800778, 3GPP TSG-RAN WG2 NR Ad hoc 1801, Vancouver, Canada, Jan. 22-26, 2018, all pages.
"On switching between CFRA and CBRA", R2-1806166, 3GPP TSG-RAN WG2 Meeting #101Bis, Sanya, China, Apr. 16-20, 2018, all pages.
"Discussion on BWP linkage for CFRA", R2-1808234, 3GPP TSG RAN WG1 Meeting #93, Busan, Korea, May 21-25, 2018, all pages.
"Change Request" Re "Further corrections with switching of bandwidth part and random access", R2-1809516, 3GPP TSG-RAN WG2 AH-1807, Montreal, Canada, Jul. 2-6, 2018, all pages.
"Further consideration on BWP linkage", R2-1810422, 3GPP TSG-RAN WG2 Meeting #AH NR 1802, Montreal, Canada, Jul. 6, 2018, all pages.
JP Office Action issued in the corresponding JP patent App. No. 2021-500271 dated Dec. 14, 2021 with English translation provided by Global Dossier, all pages.
Huawei, HiSilicon, Furhter considerations on RACH realted BWP issues [online], 3GPP TSG RAN WG2 #101 R2-1801815, Internet <URL:http://www.3gpp.org/ftp/tsg_ran/WG2_RL2/TSGR2_101/Docs/R2-1801815.zip>, Feb. 16, 2018, all pages.
Samsung, Random Access in RRC Connected: Bandwidth Part Aspects [online], 3GPP TSG RAN WG2 #99bis R2-1710091, Internet<URL:http://www.3gpp.org/ftp/tsg_ran/WG2_RL2/TSGR2_99bis/Docs/R2-1710091.zip>, Sep. 29, 2017, all pages.
Huawei, HiSilicon, Clarification on RA procedure for BFR on BWPs without CBRA occasions [online], 3GPP TSG RAN WG2 adhoc_2018_07_NR, R2-1810513, Internet <URL:http://www.3gpp.org/ftp/tsg_ran/WG2_RL2/TSGR2_AHs/2018_07_NR/Docs/R2-1810513.zip>, Jun. 22, 2018, all pages.

* cited by examiner

RANDOM ACCESS METHOD AND TERMINAL

CROSS-REFERENCE TO RELATED APPLICATIONS

This application is the U.S. national phase of PCT Application No. PCT/CN2019/094547 filed on Jul. 3, 2019, which claims priority to Chinese Patent Application No. 201810739005.4 filed in China on Jul. 6, 2018, the disclosures of which are incorporated herein by reference in their entireties.

TECHNICAL FIELD

The present disclosure relates to the technical field of communication application, in particular to a random access method and a terminal.

BACKGROUND

In a new generation radio communication system (5G or NR system), network bandwidth can be much larger than terminal transmission bandwidth, a network side divides the network side bandwidth into a plurality of Band Width Parts (BWPs), one or more of the BWPs are configured to a terminal, and a part of the BWPs can be activated for transmission. From the terminal perspective, the transmission of signaling and data can only be performed on the active BWPs. After the network side configures a plurality of BWPs for the terminal, the active BWPs can be changed by using physical layer signaling downlink control information (DCI), and an uplink active BWP and a downlink active BWP can be changed respectively. In addition, a BWP inactivity timer (bwp-InactivityTimer) is further introduced, when the bwp-InactivityTimer expires, the downlink active BWP of the terminal is changed to a default downlink BWP, and if the default downlink BWP is not configured, the downlink active BWP is changed to an initial BWP.

After introducing the BWPs, the terminal and the base station need to determine on which uplink BWP the random access is initiated and on which downlink BWP a random access response is transmitted, so as to avoid the mismatch of the sending BWPs and the receiving BWPs between the terminal and the base station in the random access procedure.

In NR system, a way of adopting the same BWP number in the random access producer is introduced, namely, the uplink BWP number of the uplink transmission (Msg1, Msg3) initiated by the terminal is the same as the downlink BWP number of the downlink transmission (Msg2, Msg4) received by the terminal. If the numbers of the uplink and downlink BWPs on which the terminal is operated are inconsistent, the terminal changes the downlink BWP to a downlink BWP with the same number as the number of the uplink BWP for initiating Msg1 before initiating random access. For example, currently active BWPs of the terminal are DL BWP1 and UL BWP2, and when the terminal initiates random access on the UL BWP2, the downlink BWP is firstly changed to the DL BWP2.

For non-contention random access, if the numbers of the uplink and downlink BWPs are defined to be the same, when the numbers of the activated uplink and downlink BWPs of the terminal are different at the time of triggering the non-contention random access, the terminal must perform downlink BWP change. There are two possible consequences as following.

1) in order to perform the non-contention random access, the base station must set the numbers of the uplink and downlink BWPs for the non-contention random access to be the same, but firstly, the non-contention random access triggered by a physical downlink control channel (PDCCH) cannot be realized in this way since the non-contention random access triggered by the PDCCH can only be performed on the currently active BWP; secondly, the configuration flexibility of the base station is influenced, and the basic principle for configuring and activating the uplink and downlink BWPs independently violated.

2) if the numbers of the uplink and downlink BWPs configured (RRC configuration or PDCCH command) by the base station for non-contention random access are different, the downlink BWP change by the terminal destroys this relationship, resulting in the failure of random access.

The uplink and downlink BWPs in the non-contention random access procedure are configured by the base station, and if for some reason, the changed uplink and downlink BWPs of the terminal do not match with the configured uplink and downlink BWPs corresponding to the non-contention random access resource, a current protocol does not determine how to perform the random access procedure.

SUMMARY

The present disclosure aims to provide a random access method and a terminal, which are used for solving the problem that in a non-contention random access process, when uplink and downlink BWPs of the terminal do not match with the configured uplink and downlink BWPs corresponding to non-contention random access resource, a current protocol does not determine how to perform random access.

In order to achieve the above object, an embodiment of the present disclosure provides a random access method applied to a terminal, including: when non-contention random access is initiated and current uplink and downlink Band Width Parts (BWPs) are inconsistent with uplink and downlink BWPs configured by a base station for non-contention random access, setting, by the terminal, active BWPs as an uplink BWP and a downlink BWP having the same number, and performing contention random access on the active BWPs; or setting, by the terminal, the active BWPs as the uplink BWP and the downlink BWP configured by the base station for non-contention random access, and performing the non-contention random access on the active BWPs.

In some embodiment of the present disclosure, the current uplink and downlink BWPs include: currently activated uplink and downlink BWPs, or changed uplink and downlink BWPs based on BWP change signaling, or changed uplink and downlink BWPs based on expiration of a BWP inactivity timer; the BWPs configured by the base station for non-contention random access include: an uplink BWP configured by the base station and including non-contention random access resource and a downlink BWP configured by the base station and including a control resource set (CORE-SET) for monitoring a random access response; the current uplink and downlink BWPs being inconsistent with the uplink and downlink BWPs configured by the base station for non-contention random access, includes: the current uplink BWP is the same as the uplink BWP configured by the base station, the current downlink BWP is different from the downlink BWP configured by the base station; or the current downlink BWP is the same as the downlink BWP configured by the base station, the current uplink BWP is different from the uplink BWP configured by the base station.

In some embodiment of the present disclosure, the setting, by the terminal, active BWPs to an uplink BWP and a downlink BWP having the same number, and performing contention random access on the active BWPs, includes: receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

In some embodiment of the present disclosure, the setting, by the terminal, the active BWPs as the uplink BWP and the downlink BWP configured by the base station for non-contention random access, and performing the non-contention random access on the active BWPs, includes: after a BWP change command for changing the downlink BWP or changing the uplink BWP sent by the base station is received, if the currently activated uplink BWP and the currently activated downlink BWP perform the non-contention random access, ignoring the BWP change command, and reserving the currently activated uplink BWP and the currently activated downlink BWP; or after the BWP change command for changing the downlink BWP or changing the uplink BWP sent by the base station is received, if the currently activated uplink BWP and the currently activated downlink BWP perform the non-contention random access, after the BWPs are changed to the BWPs indicated by the base station, setting the active BWPs as the currently activated uplink BWP and the downlink BWP corresponding to the currently activated uplink BWP in the base station non-contention random access resource configuration, or, setting the active BWPs as the currently activated downlink BWP and the uplink BWP corresponding to the currently activated downlink BWP in the base station non-contention random access resource configuration; or under the condition that the BWP inactivity timer expires, if the currently activated uplink BWP and the currently activated downlink BWP perform the non-contention random access, ignoring the expiration information of the BWP inactivity timer, and reserving the currently activated uplink BWP and the currently activated downlink BWP; or under the condition that the BWP timer expires, if the currently activated uplink BWP and the currently activated downlink BWP perform the non-contention random access, after the downlink BWP is changed to the default downlink BWP or the initial downlink BWP, setting the active BWPs as the currently activated uplink BWP and the downlink BWP corresponding to the currently activated uplink BWP in the base station non-contention random access resource configuration; or when there is a non-contention random access resource configuration on the currently activated uplink BWP, and the currently activated downlink BWP is not the downlink BWP for non-contention random access corresponding to the currently activated uplink BWP, setting the active BWPs as the currently activated uplink BWP and the downlink BWP corresponding to the currently activated uplink BWP in the base station non-contention random access resource configuration; or when there is a non-contention random access resource configuration on the currently activated downlink BWP, and the currently activated uplink BWP is not the uplink BWP for non-contention random access corresponding to the currently activated downlink BWP, setting the active BWPs as the currently activated downlink BWP and the uplink BWP corresponding to the currently activated downlink BWP in the base station non-contention random access resource configuration.

An embodiment of the present disclosure provides a terminal including: a transceiver, a memory, a processor, and programs stored on the memory and executable on the processor, wherein the processor executes the programs to implement the following steps: when non-contention random access is initiated and current uplink and downlink Band Width Parts (BWPs) are inconsistent with uplink and downlink BWPs configured by a base station for non-contention random access, setting, by the terminal, active BWPs as an uplink BWP and a downlink BWP having the same number, and performing contention random access on the active BWPs; or setting, by the terminal, the active BWPs as the uplink BWP and the downlink BWP configured by the base station for non-contention random access, and performing the non-contention random access on the active BWPs.

In some embodiment of the present disclosure, the current uplink and downlink BWPs include: currently activated uplink and downlink BWPs, or changed uplink and downlink BWPs based on BWP change signaling, or changed uplink and downlink BWPs based on expiration of a BWP inactivity timer; the BWPs configured by the base station for non-contention random access include: an uplink BWP configured by the base station and including non-contention random access resource and a downlink BWP configured by the base station and including a control resource set (CORE-SET) for monitoring a random access response; the current uplink and downlink BWPs being inconsistent with the uplink and downlink BWPs configured by the base station for non-contention random access, includes: the current uplink BWP is the same as the uplink BWP configured by the base station, the current downlink BWP is different from the downlink BWP configured by the base station; or the current downlink BWP is the same as the downlink BWP configured by the base station, the current uplink BWP is different from the uplink BWP configured by the base station.

In some embodiment of the present disclosure, the processor executes the programs to further implement the following steps: receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

In some embodiment of the present disclosure, the processor executes the programs to further implement the following steps: after a BWP change command for changing the downlink BWP or changing the uplink BWP sent by the base station is received, if the currently activated uplink BWP and the currently activated downlink BWP perform the non-contention random access, ignoring the BWP change command, and reserving the currently activated uplink BWP and the currently activated downlink BWP; or after the BWP change command for changing the downlink BWP or changing the uplink BWP sent by the base station is received, if the currently activated uplink BWP and the currently activated downlink BWP perform the non-contention random access, after the BWPs are changed to the BWPs indicated by the base station, setting the active BWPs as the currently activated uplink BWP and the downlink BWP corresponding to the currently activated uplink BWP in the base station non-contention random access resource configuration, or, setting the active BWPs as the currently activated downlink BWP and the uplink BWP corresponding to the currently activated downlink BWP in the base station non-contention random access resource configuration; or under the condition that the BWP inactivity timer expires, if the currently activated uplink BWP and the currently activated downlink BWP perform the non-contention random access, ignoring the expiration information of the BWP inactivity timer, and reserving the currently activated uplink BWP and the currently activated downlink BWP; or under the condition that the BWP timer expires, if the currently activated uplink BWP and the currently activated downlink BWP perform the non-contention random access, after the downlink BWP is changed to the default downlink BWP or the initial downlink BWP, setting the active BWPs as the currently activated uplink BWP and the downlink BWP corresponding to the currently activated uplink BWP in the base station non-contention random access resource configuration; or when there is a non-contention random access resource configuration on the currently activated uplink BWP, and the currently activated downlink BWP is not the downlink BWP for non-contention random access corresponding to the currently activated uplink BWP, setting the active BWPs as the currently activated uplink BWP and the downlink BWP corresponding to the currently activated uplink BWP in the base station non-contention random access resource configuration; or when there is a non-contention random access resource configuration on the currently activated downlink BWP, and the currently activated uplink BWP is not the uplink BWP for non-contention random access corresponding to the currently activated downlink BWP, setting the active BWPs as the currently activated downlink BWP and the uplink BWP corresponding to the currently activated downlink BWP in the base station non-contention random access resource configuration.

An embodiment of the present disclosure provides a computer readable storage medium storing programs, wherein when the programs are executed by a processor, the steps of the random access method are implemented.

An embodiment of the present disclosure provides a terminal, including: a processing module, configured to, when non-contention random access is initiated and current uplink and downlink Band Width Parts (BWPs) are inconsistent with uplink and downlink BWPs configured by a base station for non-contention random access, set active BWPs as an uplink BWP and a downlink BWP having the same number, and perform contention random access on the active BWPs; or set the active BWPs as the uplink BWP and the downlink BWP configured by the base station for non-contention random access, and perform the non-contention random access on the active BWPs.

In some embodiment of the present disclosure, the current uplink and downlink BWPs include: currently activated uplink and downlink BWPs, or changed uplink and downlink BWPs based on BWP change signaling, or changed uplink and downlink BWPs based on expiration of a BWP inactivity timer; the BWPs configured by the base station for non-contention random access include: an uplink BWP configured by the base station and including non-contention random access resource and a downlink BWP configured by the base station and including a control resource set (CORESET) for monitoring a random access response; the current uplink and downlink BWPs being inconsistent with the uplink and downlink BWPs configured by the base station for non-contention random access, includes: the current uplink BWP is the same as the uplink BWP configured by the base station, the current downlink BWP is different from the downlink BWP configured by the base station; or the current downlink BWP is the same as the downlink BWP configured by the base station, the current uplink BWP is different from the uplink BWP configured by the base station.

In some embodiment of the present disclosure, the processing module is configured to receive a BWP change command for changing the downlink BWP or changing the uplink BWP sent by the base station; change the BWPs according to the BWP change command, determine the changed active BWPs, and if the numbers of the active uplink and downlink BWPs are different, set the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, set the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, set the active BWPs as the currently activated uplink BWP and a downlink BWP with the same number as the currently activated uplink BWP.

In some embodiment of the present disclosure, the processing module is configured to receive a BWP change command for changing the downlink BWP or changing the uplink BWP sent by the base station, if the currently activated uplink BWP and the currently activated downlink BWP perform the non-contention random access, ignore the BWP change command, and reserve the currently activated uplink BWP and the currently activated downlink BWP; or after the BWP change command for changing the downlink BWP or changing the uplink BWP sent by the base station is received, if the currently activated uplink BWP and the currently activated downlink BWP perform the non-contention random access, after the BWPs are changed to the BWPs indicated by the base station, set the active BWPs as the currently activated uplink BWP and the downlink BWP corresponding to the currently activated uplink BWP in the base station non-contention random access resource configuration, or set the active BWPs as the currently activated downlink BWP and the uplink BWP corresponding to the currently activated downlink BWP in the base station non-contention random access resource configuration; or under the condition that the BWP inactivity timer expires, if the currently activated uplink BWP and the currently activated downlink BWP perform the non-contention random access, ignore the expiration information of the BWP inactivity timer, and reserve the currently activated uplink BWP and the currently activated downlink BWP; or under the condition that the BWP timer expires, if the currently activated uplink BWP and the currently activated downlink BWP perform the non-contention random access, after the downlink BWP is changed to the default downlink BWP or the initial downlink BWP, set the active BWPs as the currently activated uplink BWP and the downlink BWP corresponding to the currently activated uplink BWP in the base station non-contention random access resource configuration; or when there is a non-contention random access resource configuration on the currently activated uplink BWP, and the currently activated downlink BWP is not the downlink BWP for non-contention random access corresponding to the currently activated uplink BWP, set the active BWPs as the currently activated uplink BWP and the downlink BWP corresponding to the currently activated uplink BWP in the base station non-contention random access resource configuration; or when there is a non-contention random access resource configuration on the currently activated downlink BWP, and the currently activated uplink BWP is not the uplink BWP for non-contention random access corresponding to the currently activated downlink BWP, set the active BWPs as the currently activated downlink BWP and the uplink BWP corresponding to the currently activated downlink BWP in the base station non-contention random access resource configuration.

The embodiments of the present disclosure have the following beneficial effects:

according to the random access method of the embodiment of the present disclosure, when non-contention random access is initiated and the current uplink and downlink Band Width Parts (BWPs) are inconsistent with the uplink and downlink BWPs configured by the base station for non-contention random access, the terminal resets the active BWPs, such as setting the uplink BWP and the downlink BWP having the same number as the active BWPs for performing contention random access, or setting the uplink BWP and downlink BWP configured by the base station for non-contention random access as the active BWPs for performing non-contention random access, so that the problem of how to perform random access when the current uplink and downlink BWPs are inconsistent with the uplink and downlink BWPs configured by the base station for non-contention random access is solved.

DETAILED DESCRIPTION

The technical schemes of the embodiments of the present disclosure will be described below clear and more fully in conjunction with the accompanying drawings in the embodiments of the present disclosure. Obviously, the described embodiments are some, but not all of the embodiments of the present disclosure. All other embodiments made by those skilled in the art based on the embodiments in the present disclosure without inventive effort are within the protection scope of the present disclosure.

In order that those skilled in the art can better understand the random access method of the embodiments of the present disclosure, the random access procedure in the related art is described as follows.

There are two kinds of random access procedures that are contention random access and non-contention random access. The respective procedures are as follows.

The contention random access procedure is mainly divided into four steps.

Msg1: User Equipment (UE) selects a random access preamble code and random access resource (Physical Random Access Channel, PRACH), and transmits the selected random access preamble code to a base station on the selected PRACH resource.

Msg2: the base station receives a random access request Msg1, and sends a random access response to the UE, the random access response includes an uplink timing advance, an uplink resource UL grant allocated for Msg3 and a cell radio network temporary identifier (C-RNTI) allocated by a network side. A PDCCH bearing the Msg2 scheduling message is scrambled by a random access radio network temporary identifier (RA-RNTI), Msg2 further carries a preamble ID, and the UE determines that Msg2 corresponds to Msg1 sent by the UE through the radio network temporary identifier (RA-RNTI) and the preamble ID.

Msg3: the UE sends uplink transmission on the UL grant allocated by Msg2, the content of the uplink transmission of Msg3 is different for different random access reasons, for example, for initial access, Msg3 transmits a RRC connection establishment request.

Msg4: a contention resolution message, the UE can determine whether the random access succeeds or not according to Msg4. For initial access of the UE, the temporary C-RNTI is automatically converted into the unique UE identifier C-RNTI of the UE in the cell after the contention resolution succeeds.

The non-contention random access procedure is mainly divided into the following three steps. The non-contention random access is used for three scenes of random access trigged by a PDCCH command, switching and beam failure recovery.

Msg0: a base station allocates a dedicated preamble for non-contention random access and PRACH resource for random access to UE.

Msg1: the UE sends the specified dedicated preamble to the base station on the specified PRACH resource according to the indication of Msg0. The base station calculates the uplink timing advance (TA) according to Msg1 after receiving Msg1.

Msg2: the base station sends a random access response to the UE. In most random access scenarios, the format of the random access response is the same as the contention random access, and the terminal completes the contention resolution through the same random access preamble identification (RAPID) in the random access response MAC RAR and the preamble sent by Msg1. NR further introduces a new non-contention random access scenario: beam failure recovery. In this scenario, Msg2 is the PDCCH carrying the C-RNTI. As long as the C-RNTI is consistent with the C-RNTI of the terminal, the terminal determines that the random access succeeds and thus the beam failure recovery succeeds. The random access resource used for the beam failure recovery and the control resource set (CORESET) for receiving the random access response are allocated in advance by RRC signaling and include the respective uplink and the downlink BWPs.

Figure 1:
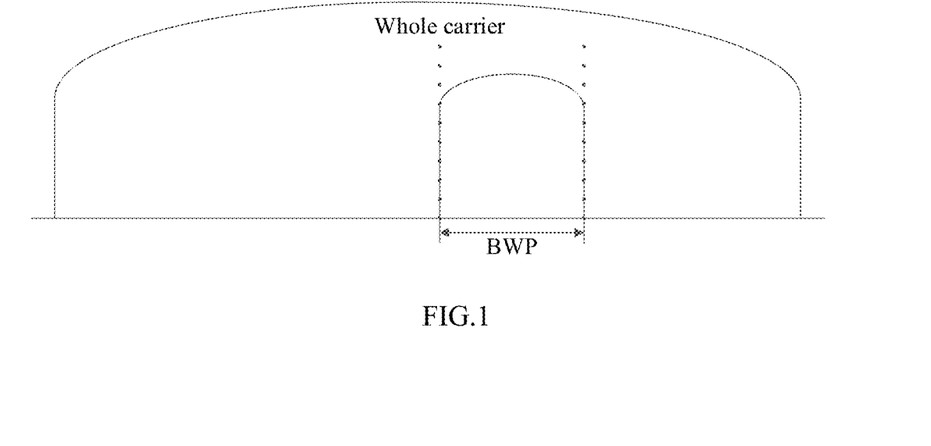
FIG. 1 is a schematic diagram of a first configuration scenario for a BWP.
Figure 2:
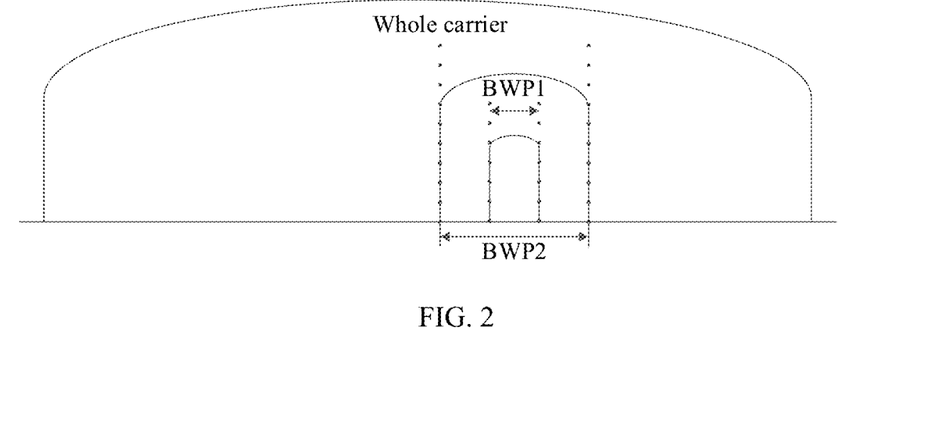
FIG. 2 is a schematic diagram of a second configuration scenario for a BWP.
Figure 3:
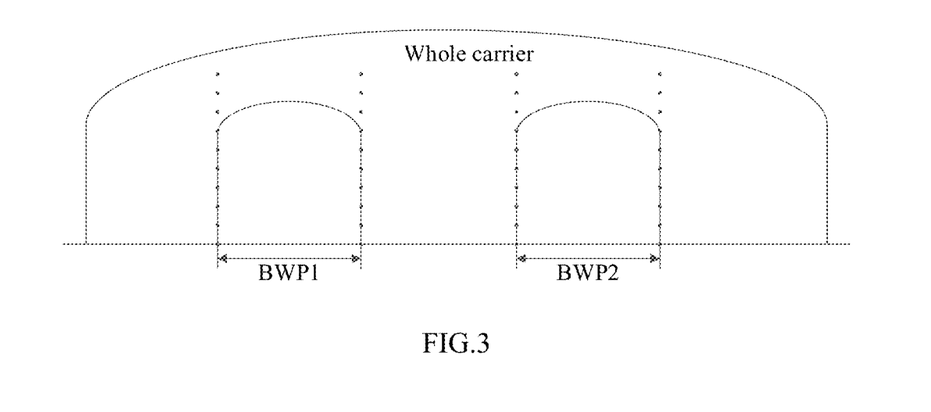
FIG. 3 is a schematic diagram of a third configuration scenario for a BWP.

Further, the following description is made with respect to BWP: in the Long Term Evolution (LTE) system in the related art, the cell bandwidth of the network side is smaller than or equal to 20 MHz of the receiving bandwidth of the terminal, so that the network side always configures the uplink and downlink total bandwidth of the cell to the terminal, and the terminal can operate on the whole cell bandwidth. In the NR system, the network side bandwidth can be as high as 400 MHz, much larger than the receiving capability of the terminal. Therefore, the concept of BWP is introduced, that is, dividing the large bandwidth of the network side into multiple Band Width Parts (BWPs), one or more BWPs are configured to the terminal, and some configured BWPs are activated to perform uplink and downlink transmission for the terminal, the activated downlink BWP is called active DL BWP, and the activated uplink BWP is called active UL BWP. In the R15 version, only one DL BWP and one UL BWP are allowed to be activated at one time for the terminal, and the inactive BWPs cannot perform uplink and downlink signaling and data transmission. FIG. 1, FIG. 2 and FIG. 3 are schematic diagrams of typical configuration scenarios for a BWP.

For BWP, 3GPP further defines some basic concepts as follows.

Initial BWP: for an initially accessed terminal, the connection establishment process can only be completed by using the initial BWP. The initial BWP includes basic cell broadcast signaling and random access resource, etc.

Default BWP: a network side base station (gNB) can configure a default BWP for a terminal in a connected state, and the terminal can perform some basic operation on the default BWP, such as maintaining cell connection, performing cell measurement, initiating random access.

Configured BWP: BWPs configured by the network side to a single terminal in the connected state, each BWP can have different configuration contents, such as PUCCH configuration, SPS configuration. The DL BWP and UL BWP may be configured independently.

Active BWP: among the BWPs configured by the network side for the terminal, the terminal only uses the active BWPs for uplink and downlink transmission. The active BWPs are divided into an active DL BWP and an active UL BWP.

After the network side configures multiple BWPs for the terminal, the physical layer signaling DCI can be used for changing active BWPs, and uplink and downlink active BWPs can be changed independently. In addition, a Band Width inactivity timer (bwp-Inactivity timer) is further introduced, when the BWP inactivity timer expires, the downlink active BWP of the terminal is changed to the default downlink BWP, and if the default downlink BWP is not configured, the downlink active BWP is changed to the initial BWP.

Figure 4:
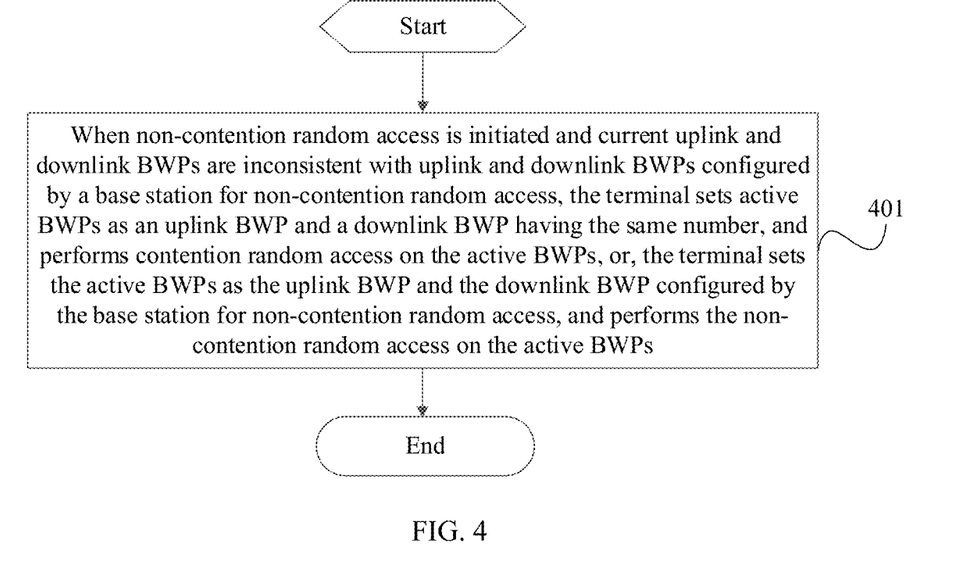
FIG. 4 is a flow chart of a random access method according to an embodiment of the present disclosure.

FIG. 4 is a flow chart of a random access method according to an embodiment of the present disclosure. As shown in FIG. 4, the random access method according to the embodiment of the present disclosure is applied to a terminal, and includes the following steps.

Step 401: when non-contention random access is initiated and current uplink and downlink Band Width Parts (BWPs) are inconsistent with uplink and downlink BWPs configured by a base station for non-contention random access, the terminal sets active BWPs as an uplink BWP and a downlink BWP having the same number, and performs contention random access on the active BWPs, or, the terminal sets the active BWPs as the uplink BWP and the downlink BWP configured by the base station for non-contention random access, and performs the non-contention random access on the active BWPs.

Here, the current uplink and downlink Band Width Parts (BWPs) include: currently activated uplink and downlink BWPs, or uplink and downlink BWPs that may be changed based on BWP change signaling, or uplink and downlink BWPs that may be changed based on expiration of a BWP inactivity timer. Wherein the currently activated uplink and downlink BWPs include a currently activated uplink BWP and a currently activated downlink BWP; the BWP change signaling is used for indicating change of the uplink BWP, or used for indicating change of the downlink BWP, or used for indicating change of the uplink BWP and the downlink BWP, and the uplink and the downlink BWPs that may be changed based on the BWP change signaling include a possibly changed uplink BWP or a possibly changed downlink BWP or the possibly changed uplink BWP and downlink BWP.

The BWPs configured by the base station for non-contention random access include: an uplink BWP configured by the base station and including non-contention random access resource and a downlink BWP configured by the base station and including a control resource set (CORESET) for monitoring a random access response.

It should be noted that, the BWPs configured by the base station for non-contention random access in the embodiment of the present disclosure include the uplink BWP configured by the base station for non-contention random access and the downlink BWP configured by the base station for non-contention random access. Wherein, the uplink BWP configured by the base station for non-contention random access not only can be the uplink BWP configured by the base station and including non-contention random access resource, but also can be other uplink BWPs for non-contention random access, the downlink BWP configured by the base station for non-contention random access not only can be the downlink BWP configured by the base station and including a control resource set (CORESET) for monitoring a random access response, but also can be other downlink BWPs for non-contention random access. In the embodiment of the present disclosure, the current uplink and downlink Band Width Parts (BWPs) being inconsistent with the uplink and downlink BWPs configured by the base station for non-contention random access, includes: the current uplink BWP is the same as the uplink BWP configured by the base station, but the current downlink BWP is different from the downlink BWP configured by the base station; or the current downlink BWP is the same as the downlink BWP configured by the base station, but the current uplink BWP is different from the uplink BWP configured by the base station.

Specifically, the current uplink BWP refers to an uplink BWP indicated by the current base station BWP change command, and the current downlink BWP refers to a downlink BWP indicated by the current base station BWP change command.

Alternatively, the current uplink BWP refers to an uplink BWP that is currently activated and has not received the BWP change command, and the current downlink BWP refers to a downlink BWP that is currently activated and has not received the BWP change command.

Alternatively, the current uplink BWP refers to the currently activated uplink BWP, and the current downlink BWP refers to the changed downlink BWP due to the expiration of the Band Width Part inactivity timer.

Alternatively, the current uplink BWP refers to the currently activated uplink BWP, and the current downlink BWP refers to the currently activated downlink BWP.

According to the random access method of the embodiment of the present disclosure, when non-contention random access is initiated and the current uplink and downlink Band Width Parts (BWPs) are inconsistent with the uplink and downlink BWPs configured by the base station for non-contention random access, the terminal resets the active BWPs, such as setting the uplink BWP and the downlink BWP having the same number as the active BWPs for performing contention random access, or setting the uplink BWP and downlink BWP configured by the base station for non-contention random access as the active BWPs for performing non-contention random access, so that the problem of how to perform random access when the current uplink and downlink BWPs are inconsistent with the uplink and downlink BWPs configured by the base station for non-contention random access is solved.

As a first alternative implementation mode, in step 401, the terminal sets the active BWPs as the uplink BWP and the downlink BWP having the same number, and performs contention random access on the active BWPs, includes the following steps.

A BWP change command for changing the downlink BWP or changing the uplink BWP sent by the base station is received; the BWPs are changed according to the BWP change command, the changed active BWPs are determined, and if the numbers of the active uplink and downlink BWPs are different, the active BWPs are set as the currently activated uplink BWP and a downlink BWP with the same BWP number as the currently activated uplink BWP.

Alternatively, under the condition that the Band Width Part inactivity timer expires, after the downlink BWP is change to a default downlink BWP or an initial downlink BWP, if the numbers of the active uplink and downlink BWPs are different, the active BWPs are set as the currently activated uplink BWP and a downlink BWP with the same BWP number as the currently activated uplink BWP.

Alternatively, when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, the active BWPs are set as the currently activated uplink BWP and a downlink BWP with the same BWP number as the currently activated uplink BWP.

Wherein, the numbers of the activated uplink and downlink BWPs are different, which means the number of the active uplink BWP is different from the number of the active downlink BWP.

In this first implementation mode, the active BWPs are set as the currently activated uplink BWP and the downlink BWP with the same number as the currently activated uplink BWP, specifically includes: if there is a contention random access resource configuration on the currently activated uplink BWP, the downlink BWP is change to a downlink BWP with the same number as the currently activated uplink BWP, for example, if the uplink BWP is UL BWP1, the downlink BWP is change to DL BWP1; if there is no contention random access resource configuration on the currently activated uplink BWP, the uplink BWP is changed to an initial uplink BWP (UL BWP0) and simultaneously the downlink BWP is changed to the initial downlink BWP (DL BWP0), and the contention random access is performed on the initial uplink and downlink BWPs.

The first implementation mode is illustrated below in conjunction with the following examples, wherein embodiments 1, 2 and 3 are directed to beam failure recovery and embodiments 4 and 5 are directed to non-contention random access triggered by the PDCCH command.

Embodiment 1

When the terminal detects the beam failure, the terminal receives a radio resource control (RRC) signaling or a PDCCH command for changing the downlink BWP or the uplink BWP sent by the base station, and returns to contention random access.

Terminal Side:

Step 1: the terminal detects the beam failure and determines to initiate beam failure recovery. The RRC command or PDCCH command for changing the downlink or uplink BWP sent by the base station is received at this time.

Step 2: the terminal changes the BWPs according to the base station side command.

Step 3: the terminal initiates contention random access based on the currently activated uplink BWP, specifically: if the currently activated uplink BWP (UL BWP1) has contention random access resource, the terminal changes the downlink BWP to a downlink BWP (UL BWP1) with the same number as the current active uplink BWP, and performs the contention random access on the DL BWP1 and the UL BWP1; if the currently activated BWP (UL BWP1) does not have the contention random access resource, the terminal changes the uplink BWP to the initial uplink BWP (UL BWP0) and simultaneously changes the downlink BWP to the initial downlink BWP (DL BWP0), and performs the contention random access on the initial uplink and downlink BWPs.

Base Station Side:

Step 1: the base station sends the RRC command or the PDCCH command for changing the downlink or uplink BWP to the terminal.

Step 2: the base station changes the uplink and downlink BWPs of the terminal to the indicated uplink and downlink BWPs.

Step 3: the base station receives a random access request sent on an UL BWPx, sends a random access response on a DL BWPx with the same number, and completes a subsequent random access process on the UL BWPx and the DL BWPx. (From the perspective of the base station, which terminal cannot be accurately identified before the contention random access is completed), wherein x represents the number of BWP.

Embodiment 2

When the terminal detects the beam failure, and the bwp-InactivityTimer expires, the terminal returns to contention random access.

Terminal Side:

Step 1: the terminal detects the beam failure and determines to initiate beam failure recovery. At this time, the bwp-InactivityTimer expires.

Step 2: the terminal changes the downlink DL BWP to the default DL BWP, and if the default DL BWP is not configured, the terminal changes the downlink DL BWP to the initial DL BWP.

Step 3: the terminal initiates contention random access based on the currently activated uplink BWP, specifically: if the current active uplink BWP (UL BWP1) has contention random access resource, the terminal changes the downlink BWP to a downlink BWP (DL BWP1) with the same number as the currently activated uplink BWP, and performs the contention random access on the DL BWP1 and the UL BWP1; if the currently activated BWP (UL BWP1) does not have the contention random access resource, the terminal changes the uplink BWP to the initial uplink BWP (UL BWP0) and simultaneously changes the downlink BWP to the initial downlink BWP (DL BWP0), and performs the contention random access on the initial uplink and downlink BWPs.

Base Station Side:

Steps 1 and 2 of the terminal side are both terminal autonomous behaviors and cannot be perceived by the base station. The base station can only perform the contention random access procedure. That is, the base station receives a random access request sent on an UL BWPx, sends a random access response on a DL BWPx with the same BWP number, and completes a subsequent random access process on the UL BWPx and the DL BWPx.

Embodiment 3

When the terminal detects the beam failure, and the currently activated uplink and downlink BWPs are inconsistent with the pair of uplink and downlink BWPs for the non-contention random access configured by the base station for the terminal, the terminal returns to contention random access.

Wherein, the currently activated uplink and downlink BWPs are inconsistent with the pair of uplink and downlink BWPs for the non-contention random access configured by the base station for the terminal, which includes two situations: the currently activated DL BWP is configured with a CORESET monitoring a beam failure recovery (BFR) response, but the activated UL BWP is not a UL BWP matching with the currently activated DL BWP and including non-contention random access resource for BFR; or the currently activated UL BWP has non-contention random access resource for BFR, but the activated DL BWP is not a DL BWP matching with the currently activated UL BWP and including CORESET configuration for BFR response.

Terminal Side:

Step 1: the terminal detects the beam failure and determines to initiate beam failure recovery;

Step 2: the terminal determines that the currently activated DL BWP and UL BWP are inconsistent with the pair of uplink and downlink BWPs for non-contention random access resource configured by the base station for BFR;

Step 3: the terminal initiates contention random access based on the currently activated uplink BWP, specifically: if the currently activated uplink BWP (UL BWP1) has contention random access resource, the terminal changes the downlink BWP to a downlink BWP (UL BWP1) with the same number as the currently activated uplink BWP, and performs the contention random access on the DL BWP1 and the UL BWP1; if the currently activated BWP (UL BWP1) does not have the contention random access resource, the terminal changes the uplink BWP to the initial uplink BWP (UL BWP0) and simultaneously changes the downlink BWP to the initial downlink BWP (DL BWP0), and performs the contention random access on the initial uplink and downlink BWPs.

Base Station Side:

Steps 1 and 2 of the terminal side are both terminal autonomous behaviors and cannot be perceived by the base station. The base station can only perform the contention random access process. That is, the base station receives a random access request sent on an UL BWPx, sends a random access response on a DL BWPx with the same BWP number, and completes a subsequent random access process on the UL BWPx and the DL BWPx.

Embodiment 4

When the PDCCH command triggers non-contention random access, the terminal receives RRC signaling or a PDCCH command for changing the downlink or uplink BWP sent by the base station, and returns to contention random access.

Terminal Side:

Step 1: the terminal receives the PDCCH command and determines to initiate non-contention random access. The RRC command or PDCCH command for changing the downlink BWP or the uplink BWP sent by the base station is received at this time.

Step 2: the terminal changes the BWPs according to the base station side command.

Step 3: the terminal initiates contention random access based on the currently activated uplink BWP, specifically: if the currently activated uplink BWP (UL BWP1) has contention random access resource, the terminal changes the downlink BWP to a downlink BWP (DL BWP1) with the same number as the currently activated uplink BWP, and performs the contention random access on the DL BWP1 and the UL BWP1; if the currently activated BWP (UL BWP1) does not have the contention random access resource, the terminal changes the uplink BWP to the initial uplink BWP (UL BWP0) and simultaneously changes the downlink BWP to the initial downlink BWP (DL BWP0), and performs the contention random access on the initial uplink and downlink BWPs.

Base Station Side:

Step 1: the base station sends the RRC command or the PDCCH command for changing the downlink or uplink BWP to the terminal.

Step 2: the base station changes the uplink and downlink BWPs of the terminal to the indicated uplink and downlink BWPs.

Step 3: the base station receives a random access request sent on an UL BWPx, sends a random access response on a DL BWPx with the same BWP number, and completes a subsequent random access process on the UL BWPx and the DL BWPx.

Embodiment 5

When the PDCCH command triggers non-contention random access, and the bwp-InactivityTimer expires, the terminal returns to contention random access.

Terminal Side:

Step 1: the terminal receives the PDCCH command and determines to initiate non-contention random access. At this time, the bwp-InactivityTimer expires.

Step 2: the terminal changes the DL BWP to the default DL BWP, and if the default DLBWP is not configured, the terminal changes the DL BWP to the initial DL BWP.

Step 3: the terminal initiates contention random access based on the currently activated uplink BWP, specifically: if the currently activated uplink BWP (UL BWP1) has contention random access resource, the terminal changes the downlink BWP to a downlink BWP (DLBWP1) with same number as the currently activated uplink BWP, and performs the contention random access on the DL BWP1 and the UL BWP1; if the currently activated BWP (UL BWP1) does not have the contention random access resource, the terminal changes the uplink BWP to the initial uplink BWP (UL BWP0) and simultaneously changes the downlink BWP to the initial downlink BWP (DL BWP0), and performs the contention random access on the initial uplink and downlink BWPs.

Base Station Side:

Steps 1 and 2 of the terminal side are both terminal autonomous behaviors and cannot be perceived by the base station. The base station can only perform the contention random access procedure. That is, the base station receives a random access request sent on an UL BWPx, sends a random access response on a DL BWPx with the same BWP number, and completes a subsequent random access process on the UL BWPx and the DL BWPx.

As a second alternative implementation mode, in step 401, the terminal sets the active BWPs as the uplink BWP and the downlink BWP configured by the base station for non-contention random access, and performs the non-contention random access on the active BWPs, includes the following steps.

A BWP change command for changing the downlink BWP or changing the uplink BWP sent by the base station is received, if the currently activated uplink BWP and the currently activated downlink BWP can perform the non-contention random access, the BWP change command is ignored, and the currently activated uplink BWP and the currently activated downlink BWP are reserved.

Alternatively, the BWP change command for changing the downlink BWP or changing the uplink BWP sent by the base station is received, if the currently activated uplink BWP and the currently activated downlink BWP can perform the non-contention random access, after the BWPs are changed to the BWPs indicated by the base station, the active BWPs are set as the currently activated uplink BWP and the downlink BWP corresponding to the currently activated uplink BWP in the base station non-contention random access resource configuration, or, the active BWPs are set as the currently activated downlink BWP and the uplink BWP corresponding to the currently activated downlink BWP in the base station non-contention random access resource configuration.

Alternatively, under the condition that the Band Width Part inactivity timer expires, if the currently activated uplink BWP and the currently activated downlink BWP can perform the non-contention random access, the expiration information of the Band Width Part inactivity timer is ignored, and the currently activated uplink BWP and the currently activated downlink BWP are reserved.

Alternatively, under the condition that the Band Width Part timer expires, if the currently activated uplink BWP and the currently activated downlink BWP can perform the non-contention random access, after the downlink BWP is changed to the default downlink BWP or the initial downlink BWP, the active BWPs are set as the currently activated uplink BWP and the downlink BWP corresponding to the currently activated uplink BWP in the base station non-contention random access resource configuration.

Alternatively, when there is a non-contention random access resource configuration on the currently activated uplink BWP, and the currently activated downlink BWP is not the downlink BWP for non-contention random access corresponding to the currently activated uplink BWP, the active BWPs are set as the currently activated uplink BWP and the downlink BWP corresponding to the currently activated uplink BWP in the base station non-contention random access resource configuration.

Alternatively, when there is a non-contention random access resource configuration on the currently activated downlink BWP, and the currently activated uplink BWP is not the uplink BWP for non-contention random access corresponding to the currently activated downlink BWP, the active BWPs are set as the currently activated downlink BWP and the uplink BWP corresponding to the currently activated downlink BWP in the base station non-contention random access resource configuration.

The second alternative implementation mode is described below in conjunction with specific embodiments. Embodiments 6, 7 and 8 are directed to beam failure recovery, and embodiments 9 and 10 are directed to the non-contention random access triggered by the PDCCH command.

Embodiment 6

When the terminal detects the beam failure, the terminal receives an RRC signaling or PDCCH command for changing downlink or uplink BWP sent by the base station and initiates non-contention random access.

Terminal Side:

Step 1: the terminal detects the beam failure and determines to initiate beam failure recovery. The RRC command or PDCCH command for changing the downlink or uplink BWP sent by the base station is received at this time.

Step 2: the terminal ignores the BWP change command at the base station side.

Step 3: the terminal initiates the non-contention random access on the currently activated uplink and downlink BWPs and performs the beam failure recovery.

Base Station Side:

Step 1: the base station sends the RRC command or the PDCCH command for changing the downlink or uplink BWP to the terminal.

Step 2: the base station changes the uplink and downlink BWPs of the terminal to the indicated uplink and downlink BWPs.

Step 3: the base station receives a random access request Msg1 initiated by the terminal on random access resource configured for the beam failure recovery of an originally activated UL BWP, determines that the terminal does not change the BWPs, and sends a beam failure recovery response on a DL BWP corresponding to the originally activated UL BWP.

Embodiment 7

When the terminal detects the beam failure, and the bwp-InactivityTimer expires, the terminal initiates non-contention random access.

Terminal Side:

Step 1: the terminal detects the beam failure and determines to initiate beam failure recovery. At this time, the bwp-InactivityTimer expires.

Step 2: the terminal changes the DL BWP to the default DL BWP, and if the default DLBWP is not configured, the terminal changes the DL BWP to the initial DL BWP.

Step 3: the terminal changes the DLBWP to a DLBWP matched with the currently activated UL BWP and performing non-contention random access beam failure recovery, and initiates the non-contention random access to perform the beam failure recovery.

Or, Step 1: the terminal detects the beam failure and determines to initiate beam failure recovery. At this time, the bwp-InactivityTimer expires.

Step 2: the terminal ignores the expiration information of the bwp-ActivityTimer and does not change the DL BWP.

Step 3: the terminal initiates the non-contention random access for the beam failure recovery on the currently activated DL BWP and UL BWP.

Base Station Side:

Steps 1 and 2 of the terminal side are both terminal autonomous behaviors and cannot be perceived by the base station. The base station can only perform a non-contention random access process. That is, the base station receives a random access request Msg1 initiated by the terminal on the random access resource configured to the beam failure recovery of the UL BWP, and sends a beam failure recovery response on a DL BWP corresponding to the active UL BWP.

Embodiment 8

When the terminal detects the beam failure, and the currently activated uplink and downlink BWPs are inconsistent with a pair of uplink and downlink BWPs for non-contention random access configured by the base station for the terminal, the terminal still initiates non-contention random access.

The currently activated uplink and downlink BWPs are inconsistent with the pair of uplink and downlink BWPs for non-contention random access configured by the base station for the terminal, which includes two situations: the currently activated DL BWP is configured with a CORESET for monitoring a BFR response, but the active UL BWP is not a UL BWP matched with the currently activated DL BWP and including non-contention random access resource for BFR; or the currently activated UL BWP has the non-contention random access resource for BFR, but the active DL BWP is not a DL BWP matched with the currently activated UL BWP and including CORESET configuration for BFR response.

Terminal Side:

Processing Mode 1: the terminal changes the DL BWP to be paired with the active UL BWP to initiate non-contention random access for beam failure recovery.

Step 1: the terminal detects the beam failure and determines to initiate beam failure recovery.

Step 2: the terminal determines that the currently activated DL BWP and UL BWP are inconsistent with the pair of uplink and downlink BWPs of non-contention random access resource configured by the base station for BFR.

Step 3: the terminal changes the DL BWP to a DL BWP that matches the active UL BWP and can initiate non-contention random access for BFR, and then initiates the non-contention random access for the beam failure recovery.

Or, processing Mode 2: the terminal changes the UL BWP to be paired with the active DL BWP to initiate non-contention random access for beam failure recovery.

Step 1: the terminal detects the beam failure and determines to initiate beam failure recovery.

Step 2: the terminal determines that the currently activated DL BWP and UL BWP are inconsistent with the pair of uplink and downlink BWPs of non-contention random access resource configured by the base station for BFR.

Step 3: the terminal changes the UL BWP to a UL BWP that matches the active DL BWP and can initiate non-contention random access for BFR, and then initiates the non-contention random access for the beam failure recovery.

Base Station Side:

Steps 1 and 2 of the terminal side are both terminal autonomous behaviors and cannot be perceived by the base station. The base station can only perform a non-contention random access process. That is, the base station receives a random access request Msg1 initiated by the terminal on random access resource configured to beam failure recovery of the UL BWP, and sends a beam failure recovery response on a DL BWP corresponding to the active UL BWP.

Embodiment 9

When the PDCCH command triggers non-contention random access, the terminal receives RRC signaling or a PDCCH command for changing downlink or uplink BWP sent by the base station, and the terminal initiates the non-contention random access.

Terminal Side:

Step 1: the terminal receives the PDCCH command and determines to initiate non-contention random access. The RRC command or PDCCH command for changing the downlink or uplink BWP sent by the base station is received at this time.

Step 2: the terminal ignores the BWP change command at the base station side.

Step 3: the terminal initiates the non-contention random access on the currently activated uplink and downlink BWPs according to the instruction of the PDCCH command.

Base Station Side:

Step 1: the base station sends the RRC command or the PDCCH command for changing the downlink or uplink BWP to the terminal.

Step 2: the base station changes the uplink and downlink BWPs of the terminal to the indicated uplink and downlink BWPs.

Step 3: the base station receives a random access request Msg1 on a random access resource indicated by the PDCCH command initiated by the terminal on an originally activated UL BWP, determines that the terminal does not change the BWPs, and sends a random access response on a DL BWP corresponding to the originally activated UL BWP.

Embodiment 10

When the PDCCH command triggers non-contention random access, and the bwp-InactivityTimer expires, the terminal initiates non-contention random access.

Terminal Side:

Step 1: the terminal receives a PDCCH command and determines to initiate non-contention random access. At this time, the bwp-InactivityTimer expires.

Step 2: the terminal ignores the expiration information of the bwp-ActivityTimer and does not change the DL BWP.

Step 3: the terminal initiates the non-contention random access on the currently activated DL BWP and UL BWP.

Base Station Side:

Steps 1 and 2 of the terminal side are both terminal autonomous behaviors and cannot be perceived by the base station. The base station can only perform a non-contention random access process. That is, the base station receives a random access request Msg1 on a random access resource indicated by the PDCCH command initiated by the terminal on the UL BWP, and sends a random access response on the originally activated DL BWP.

According to the random access method of the embodiment of the present disclosure, when non-contention random access is initiated and the current uplink and downlink Band Width Parts (BWPs) are inconsistent with the uplink and downlink BWPs configured by the base station for non-contention random access, the terminal resets the active BWPs, such as setting the uplink BWP and the downlink BWP having the same number as the active BWPs for performing contention random access, or setting the uplink BWP and downlink BWP configured by the base station for non-contention random access as the active BWPs for performing non-contention random access, so that the problem of how to perform random access when the current uplink and downlink BWPs are inconsistent with the uplink and downlink BWPs configured by the base station for non-contention random access is solved.

Figure 5:
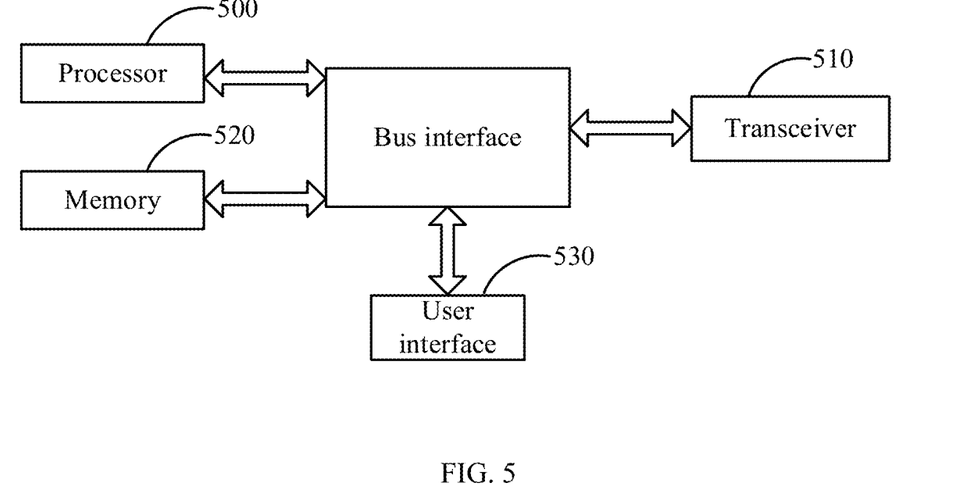
FIG. 5 is a structural block diagram of a terminal according to an embodiment of the present disclosure.

As shown in FIG. 5, an embodiment of the present disclosure further provides a terminal including: a transceiver, a memory, a processor and computer programs stored on the memory and executable on the processor, wherein the processor executes the computer programs to implement the following steps.

When non-contention random access is initiated and current uplink and downlink Band Width Parts (BWPs) are inconsistent with uplink and downlink BWPs configured by a base station for non-contention random access, the terminal sets active BWPs as an uplink BWP and a downlink BWP having the same number, and performs contention random access on the active BWPs, or, the terminal sets the active BWPs as the uplink BWP and the downlink BWP configured by the base station for non-contention random access, and performs the non-contention random access on the active BWPs.

In FIG. 5, the bus architecture may include any number of intercommunicated buses and bridges, specifically, various circuits of one or more processors represented by the processor 500 and a memory represented by the memory 520 are linked together. The bus architecture may further link various other circuits, such as peripheral devices, voltage regulators, power management circuits, which is well known in the art, and therefore will not be described further herein. The bus interface provides an interface. The transceiver 510 may be a number of elements, including a transmitter and a transceiver, providing a unit for communicating with various other devices on a transmission medium. The user interface 530 may further be an interface capable of externally and internally connecting with a desired device for different user devices, and the connected devices include but not limited to a keypad, display, speaker, microphone, joystick, etc.

The processor 500 is responsible for managing the bus architecture and general processing, and the memory 520 may store data used by the processor 500 during performing operations.

Alternatively, the current uplink and downlink Band Width Parts (BWPs) include: currently activated uplink and downlink BWPs, or changed uplink and downlink BWPs based on BWP change signaling, or changed uplink and downlink BWPs based on expiration of a BWP inactivity timer.

The BWPs configured by the base station for non-contention random access include: an uplink BWP configured by the base station and including non-contention random access resource and a downlink BWP configured by the base station and including a control resource set (CORESET) for monitoring a random access response.

The current uplink and downlink Band Width Parts (BWPs) are inconsistent with the uplink and downlink BWPs configured by the base station for non-contention random access, includes: the current uplink BWP is the same as the uplink BWP configured by the base station, but the current downlink BWP is different from the downlink BWP configured by the base station; or the current downlink BWP is the same as the downlink BWP configured by the base station, but the current uplink BWP is different from the uplink BWP configured by the base station.

Alternatively, the processor 500 is further configured to read programs in the memory 520 to implement the following steps.

A BWP change command for changing the downlink BWP or changing the uplink BWP sent by the base station is received; the BWPs are changed according to the BWP change command, the changed active BWPs are determined, and if the numbers of the active uplink and downlink BWPs are different, the active BWPs are set as the currently activated uplink BWP and a downlink BWP with the same BWP number as the currently activated uplink BWP.

Alternatively, under the condition that the Band Width Part inactivity timer expires, after the downlink BWP is change to a default downlink BWP or an initial downlink BWP, if the numbers of the active uplink and downlink BWPs are different, the active BWPs are set as the currently activated uplink BWP and a downlink BWP with the same BWP number as the currently activated uplink BWP.

Alternatively, when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, the active BWPs are set as the currently activated uplink BWP and a downlink BWP with the same BWP number as the currently activated uplink BWP.

Alternatively, the processor 500 is further configured to read programs in the memory 520 to implement the following steps.

A BWP change command for changing the downlink BWP or changing the uplink BWP sent by the base station is received, if the currently activated uplink BWP and the currently activated downlink BWP can perform the non-contention random access, the BWP change command is ignored, and the currently activated uplink BWP and the currently activated downlink BWP are reserved.

Alternatively, the BWP change command for changing the downlink BWP or changing the uplink BWP sent by the base station is received, if the currently activated uplink BWP and the currently activated downlink BWP can perform the non-contention random access, after the BWPs are changed to the BWPs indicated by the base station, the active BWPs are set as the currently activated uplink BWP and the downlink BWP corresponding to the currently activated uplink BWP in the base station non-contention random access resource configuration, or, the active BWPs are set as the currently activated downlink BWP and the uplink BWP corresponding to the currently activated downlink BWP in the base station non-contention random access resource configuration.

Alternatively, under the condition that the Band Width Part inactivity timer expires, if the currently activated uplink BWP and the currently activated downlink BWP can perform the non-contention random access, the expiration information of the Band Width Part inactivity timer is ignored, and the currently activated uplink BWP and the currently activated downlink BWP are reserved.

Alternatively, under the condition that the Band Width Part timer expires, if the currently activated uplink BWP and the currently activated downlink BWP can perform the non-contention random access, after the downlink BWP is changed to the default downlink BWP or the initial downlink BWP, the active BWPs are set as the currently activated uplink BWP and the downlink BWP corresponding to the currently activated uplink BWP in the base station non-contention random access resource configuration.

Alternatively, when there is a non-contention random access resource configuration on the currently activated uplink BWP, and the currently activated downlink BWP is not the downlink BWP for non-contention random access corresponding to the currently activated uplink BWP, the active BWPs are set as the currently activated uplink BWP and the downlink BWP corresponding to the currently activated uplink BWP in the base station non-contention random access resource configuration.

Alternatively, when there is a non-contention random access resource configuration on the currently activated downlink BWP, and the currently activated uplink BWP is not the uplink BWP for non-contention random access corresponding to the currently activated downlink BWP, the active BWPs are set as the currently activated downlink BWP and the uplink BWP corresponding to the currently activated downlink BWP in the base station non-contention random access resource configuration.

In some embodiments of the present disclosure, a computer-readable storage medium storing computer programs thereon is further provided, wherein when the programs are executed by a processor, the following steps are implemented.

When non-contention random access is initiated and current uplink and downlink Band Width Parts (BWPs) are inconsistent with uplink and downlink BWPs configured by a base station for non-contention random access, the terminal sets active BWPs as an uplink BWP and a downlink BWP having the same number, and performs contention random access on the active BWPs, or, the terminal sets the active BWPs as the uplink BWP and the downlink BWP configured by the base station for non-contention random access, and performs the non-contention random access on the active BWPs.

When the programs are executed by the processor, all of the implementation modes in the above embodiments of the random access method are implemented, and will not be described in detail herein to avoid repetition.

Figure 6:
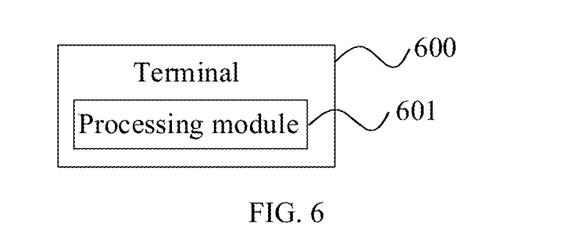
FIG. 6 is a schematic diagram of modules of a terminal according to an embodiment of the present disclosure.

As shown in FIG. 6, an embodiment of the present disclosure further provides a terminal 600 including: a processing module 601, configured to, when non-contention random access is initiated and current uplink and downlink Band Width Parts (BWPs) are inconsistent with uplink and downlink BWPs configured by a base station for non-contention random access, set active BWPs as an uplink BWP and a downlink BWP having the same number, and perform contention random access on the active BWPs; or set the active BWPs as the uplink BWP and the downlink BWP configured by the base station for non-contention random access, and perform the non-contention random access on the active BWPs.

In the terminal of the embodiment of the present disclosure, the current uplink and downlink Band Width Parts (BWPs) include: currently activated uplink and downlink BWPs, or changed uplink and downlink BWPs based on BWP change signaling, or changed uplink and downlink BWPs based on expiration of a BWP inactivity timer.

The BWPs configured by the base station for non-contention random access include: an uplink BWP configured by the base station and including non-contention random access resource and a downlink BWP configured by the base station and including a control resource set (CORESET) for monitoring a random access response.

The current uplink and downlink Band Width Parts (BWPs) are inconsistent with the uplink and downlink BWPs configured by the base station for non-contention random access, includes: the current uplink BWP is the same as the current uplink BWP is the same as the uplink BWP configured by the base station, but the current downlink BWP is different from the downlink BWP configured by the base station; or the current downlink BWP is the same as the downlink BWP configured by the base station, but the current uplink BWP is different from the uplink BWP configured by the base station.

In the terminal of the embodiment of the present disclosure, the processing module 601 is configured to receive a BWP change command for changing the downlink BWP or changing the uplink BWP sent by a base station; change the BWPs according to the BWP change command, determine the changed active BWPs; and if the BWP numbers of the activated uplink and downlink BWP are different, set the active BWPs as the currently activated uplink BWP and the downlink BWP with the same BWP number as the currently activated uplink BWP.

Alternatively, under the condition that the Band Width Part inactivity timer expires, after the downlink BWP is change to a default downlink BWP or an initial downlink BWP, if the numbers of the active uplink and downlink BWPs are different, the processing module 601 is configured to set the active BWPs as the currently activated uplink BWP and a downlink BWP with the same BWP number as the currently activated uplink BWP.

Alternatively, when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, the processing module 601 is configured to set the active BWPs as the currently activated uplink BWP and a downlink BWP with the same BWP number as the currently activated uplink BWP.

In the terminal of the embodiment of the present disclosure, the processing module 601 is configured to receive a BWP change command for changing the downlink BWP or changing the uplink BWP sent by the base station, if the currently activated uplink BWP and the currently activated downlink BWP can perform the non-contention random access, ignore the BWP change command, and reserve the currently activated uplink BWP and the currently activated downlink BWP.

Alternatively, the processing module 601 is configured to receive the BWP change command for changing the downlink BWP or changing the uplink BWP sent by the base station, if the currently activated uplink BWP and the currently activated downlink BWP can perform the non-contention random access, after the BWPs are changed to the BWPs indicated by the base station, set the active BWPs as the currently activated uplink BWP and the downlink BWP corresponding to the currently activated uplink BWP in the base station non-contention random access resource configuration, or, set the active BWPs as the currently activated downlink BWP and the uplink BWP corresponding to the currently activated downlink BWP in the base station non-contention random access resource configuration.

Alternatively, under the condition that the Band Width Part inactivity timer expires, if the currently activated uplink BWP and the currently activated downlink BWP can perform the non-contention random access, the processing module 601 is configured to ignore the expiration information of the Band Width Part inactivity timer, and reserve the currently activated uplink BWP and the currently activated downlink BWP.

Alternatively, under the condition that the Band Width Part timer expires, if the currently activated uplink BWP and the currently activated downlink BWP can perform the non-contention random access, after the downlink BWP is changed to the default downlink BWP or the initial downlink BWP, the processing module 601 is configured to set the active BWPs as the currently activated uplink BWP and the downlink BWP corresponding to the currently activated uplink BWP in the base station non-contention random access resource configuration.

Alternatively, when there is a non-contention random access resource configuration on the currently activated uplink BWP, and the currently activated downlink BWP is not the downlink BWP for non-contention random access corresponding to the currently activated uplink BWP, the processing module 601 is configured to set the active BWPs as the currently activated uplink BWP and the downlink BWP corresponding to the currently activated uplink BWP in the base station non-contention random access resource configuration.

Alternatively, when there is a non-contention random access resource configuration on the currently activated downlink BWP, and the currently activated uplink BWP is not the uplink BWP for non-contention random access corresponding to the currently activated downlink BWP, the processing module 601 is configured to set the active BWPs as the currently activated downlink BWP and the uplink BWP corresponding to the currently activated downlink BWP in the base station non-contention random access resource configuration.

According to the random access method of the embodiment of the present disclosure, when non-contention random access is initiated and the current uplink and downlink Band Width Parts (BWPs) are inconsistent with the uplink and downlink BWPs configured by the base station for non-contention random access, the terminal resets the active BWPs, such as setting the uplink BWP and the downlink BWP having the same number as the active BWPs for performing contention random access, or setting the uplink BWP and downlink BWP configured by the base station for non-contention random access as the active BWPs for performing non-contention random access, so that the problem of how to perform random access when the current uplink and downlink BWPs are inconsistent with the uplink and downlink BWPs configured by the base station for non-contention random access is solved.

In the various embodiments of the present disclosure, it should be understood that the order of the processes described above is not meant to imply an order of execution, and that the order of execution of the processes should be determined by their function and inherent logic and should not be construed as limiting the implementation process of the embodiments of the present disclosure in any way.

While the foregoing is directed to alternative embodiments of the present disclosure, it will be understood by those skilled in the art that various improvements and modifications may be made without departing from the principles of the present disclosure, and these improvements and modifications shall fall within the protection scope of the present disclosure.

What is claimed is:

1. A random access method applied to a terminal, comprising:
   when non-contention random access is initiated and current uplink and downlink Band Width Parts (BWPs) are inconsistent with uplink and downlink BWPs configured by a base station for non-contention random access, setting, by the terminal, active BWPs as an uplink BWP and a downlink BWP having the same number, and performing contention random access on the active BWPs; or setting, by the terminal, the active BWPs as the uplink BWP and the downlink BWP configured by the base station for non-contention random access, and performing the non-contention random access on the active BWPs;
   wherein the BWPs configured by the base station for non-contention random access include: an uplink BWP configured by the base station and including non-contention random access resource and a downlink BWP configured by the base station and including a control resource set (CORESET) for monitoring a random access response;
   wherein the setting, by the terminal, the active BWPs as the uplink BWP and the downlink BWP configured by the base station for non-contention random access, and performing the non-contention random access on the active BWPs, comprises:
   after a BWP change command for changing the downlink BWP or changing the uplink BWP sent by the base station is received, if the currently activated uplink BWP and the currently activated downlink BWP perform the non-contention random access, ignoring the BWP change command, and reserving the currently activated uplink BWP and the currently activated downlink BWP; or
   after the BWP change command for changing the downlink BWP or changing uplink BWP sent by the base station is received, if the currently activated uplink BWP and the currently activated downlink BWP perform the non-contention random access, after the BWPs are changed to the BWPs indicated by the base station, setting the active BWPs as the currently activated uplink BWP and the downlink BWP corresponding to the currently activated uplink BWP in the base station non-contention random access resource configuration, or, setting the active BWPs as the currently activated downlink BWP and the uplink BWP corresponding to the currently activated downlink BWP in the base station non-contention random access resource configuration; or under the condition that the BWP inactivity timer expires, if the currently activated uplink BWP and the currently activated downlink BWP perform the non-contention random access, ignoring the expiration information of the BWP inactivity timer, and reserving the currently activated uplink BWP and the currently activated downlink BWP; or under the condition that the BWP timer expires, if the currently activated uplink BWP and the currently activated downlink BWP perform the non-contention random access, after the downlink BWP is changed to the default downlink BWP or the initial downlink BWP, setting the active BWPs as the currently activated uplink BWP and the downlink BWP corresponding to the currently activated uplink BWP in the base station non-contention random access resource configuration; or when there is a non-contention random access resource configuration on the currently activated uplink BWP, and the currently activated downlink BWP is not the downlink BWP for non-contention random access corresponding to the currently activated uplink BWP, setting the active BWPs as the currently activated uplink BWP and the downlink BWP corresponding to the currently activated uplink BWP in the base station non-contention random access resource configuration; or when there is a non-contention random access resource configuration on the currently activated downlink BWP, and the currently activated uplink BWP is not the uplink BWP for non-contention random access corresponding to the currently activated downlink BWP, setting the active BWPs as the currently activated downlink BWP and the uplink BWP corresponding to the currently activated downlink BWP in the base station non-contention random access resource configuration.

2. The random access method according to claim 1, wherein, the current uplink and downlink BWPs include: currently activated uplink and downlink BWPs, or changed uplink and downlink BWPs based on BWP change signaling, or changed uplink and downlink BWPs based on expiration of a BWP inactivity timer;

the current uplink and downlink BWPs being inconsistent with the uplink and downlink BWPs configured by the base station for non-contention random access, includes: the current uplink BWP is the same as the uplink BWP configured by the base station, the current downlink BWP is different from the downlink BWP configured by the base station; or the current downlink BWP is the same as the downlink BWP configured by the base station, the current uplink BWP is different from the uplink BWP configured by the base station.

3. The random access method according to claim 1, wherein, the setting, by the terminal, active BWPs to an uplink BWP and a downlink BWP having the same number, and performing contention random access on the active BWPs, comprises:

receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

4. The random access method according to claim 2, wherein, the setting, by the terminal, active BWPs to an uplink BWP and a downlink BWP having the same number, and performing contention random access on the active BWPs, comprises:

receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

5. A terminal comprising: a transceiver, a memory, a processor, and programs stored on the memory and executable on the processor, wherein the processor executes the programs to implement the following steps:

when non-contention random access is initiated and current uplink and downlink Band Width Parts (BWPs) are inconsistent with uplink and downlink BWPs configured by a base station for non-contention random access, setting, by the terminal, active BWPs as an uplink BWP and a downlink BWP having the same number, and performing contention random access on the active BWPs; or setting, by the terminal, the active BWPs as the uplink BWP and the downlink BWP configured by the base station for non-contention random access, and performing the non-contention random access on the active BWPs;

wherein the BWPs configured by the base station for non-contention random access include: an uplink BWP configured by the base station and including non-contention random access resource and a downlink BWP configured by the base station and including a control resource set (CORESET) for monitoring a random access response;

wherein the processor executes the programs to further implement the following steps:

after a BWP change command for changing the downlink BWP or changing the uplink BWP sent by the base station is received, if the currently activated uplink BWP and the currently activated downlink BWP perform the non-contention random access, ignoring the BWP change command, and reserving the currently activated uplink BWP and the currently activated downlink BWP; or after the BWP change command for changing the downlink BWP or changing the uplink BWP sent by the base station is received, if the currently activated uplink BWP and the currently activated downlink BWP perform the non-contention random access, after the BWPs are changed to the BWPs indicated by the base station, setting the active BWPs as the currently activated uplink BWP and the downlink BWP corresponding to the currently activated uplink BWP in the base station non-contention random access resource configuration, or, setting the active BWPs as the currently activated downlink BWP and the uplink BWP corresponding to the currently activated downlink BWP in the base station non-contention random access resource configuration; or under the condition that the BWP inactivity timer expires, if the currently activated uplink BWP and the currently activated downlink BWP perform the non-contention random access, ignoring the expiration information of the BWP inactivity timer, and reserving the currently activated uplink BWP and the currently activated downlink BWP; or under the condition that the BWP timer expires, if the currently activated uplink BWP and the currently activated downlink BWP perform the non-contention random access, after the downlink BWP is changed to the default downlink BWP or the initial downlink BWP, setting the active BWPs as the currently activated uplink BWP and the downlink BWP corresponding to the currently activated uplink BWP in the base station non-contention random access resource configuration; or when there is a non-contention random access resource configuration on the currently activated uplink BWP, and the currently activated downlink BWP is not the downlink BWP for non-contention random access corresponding to the currently activated uplink BWP, setting the active BWPs as the currently activated uplink BWP and the downlink BWP corresponding to the currently activated uplink BWP in the base station non-contention random access resource configuration; or when there is a non-contention random access resource configuration on the currently activated downlink BWP, and the currently activated uplink BWP is not the uplink BWP for non-contention random access corresponding to the currently activated downlink BWP, setting the active BWPs as the currently activated downlink BWP and the uplink BWP corresponding to the currently activated downlink BWP in the base station non-contention random access resource configuration.

6. The terminal according to claim 5, wherein, the current uplink and downlink BWPs include: currently activated uplink and downlink BWPs, or changed uplink and downlink BWPs based on BWP change signaling, or changed uplink and downlink BWPs based on expiration of a BWP inactivity timer;

the current uplink and downlink BWPs being inconsistent with the uplink and downlink BWPs configured by the base station for non-contention random access, includes: the current uplink BWP is the same as the uplink BWP configured by the base station, the current downlink BWP is different from the downlink BWP configured by the base station; or the current downlink BWP is the same as the downlink BWP configured by the base station, the current uplink BWP is different from the uplink BWP configured by the base station.

7. The terminal according to claim 5, wherein, the processor executes the programs to further implement the following steps:

receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

8. The terminal according to claim 6, wherein, the processor executes the programs to further implement the following steps:

receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

9. A non-transitory computer readable storage medium storing programs, wherein when the programs are executed by a processor to implement:
   when non-contention random access is initiated and current uplink and downlink Band Width Parts (BWPs) are inconsistent with uplink and downlink BWPs configured by a base station for non-contention random access, setting, by the terminal, active BWPs as an uplink BWP and a downlink BWP having the same number, and performing contention random access on the active BWPs; or setting, by the terminal, the active BWPs as the uplink BWP and the downlink BWP configured by the base station for non-contention random access, and performing the non-contention random access on the active BWPs;
   wherein the BWPs configured by the base station for non-contention random access include: an uplink BWP configured by the base station and including non-contention random access resource and a downlink BWP configured by the base station and including a control resource set (CORESET) for monitoring a random access response;
   wherein the processor executes the programs to further implement:
   after a BWP change command for changing the downlink BWP or changing the uplink BWP sent by the base station is received, if the currently activated uplink BWP and the currently activated downlink BWP perform the non-contention random access, ignoring the BWP change command, and reserving the currently activated uplink BWP and the currently activated downlink BWP; or
   after the BWP change command for changing the downlink BWP or changing the uplink BWP sent by the base station is received, if the currently activated uplink BWP and the currently activated downlink BWP perform the non-contention random access, after the BWPs are changed to the BWPs indicated by the base station, setting the active BWPs as the currently activated uplink BWP and the downlink BWP corresponding to the currently activated uplink BWP in the base station non-contention random access resource configuration, or, setting the active BWPs as the currently activated downlink BWP and the uplink BWP corresponding to the currently activated downlink BWP in the base station non-contention random access resource configuration; or
   under the condition that the BWP inactivity timer expires, if the currently activated uplink BWP and the currently activated downlink BWP perform the non-contention random access, ignoring the expiration information of the BWP inactivity timer, and reserving the currently activated uplink BWP and the currently activated downlink BWP; or
   under the condition that the BWP timer expires, if the currently activated uplink BWP and the currently activated downlink BWP perform the non-contention random access, after the downlink BWP is changed to the default downlink BWP or the initial downlink BWP, setting the active BWPs as the currently activated uplink BWP and the downlink BWP corresponding to the currently activated uplink BWP in the base station non-contention random access resource configuration; or
   when there is a non-contention random access resource configuration on the currently activated uplink BWP, and the currently activated downlink BWP is not the downlink BWP for non-contention random access corresponding to the currently activated uplink BWP, setting the active BWPs as the currently activated uplink BWP and the downlink BWP corresponding to the currently activated uplink BWP in the base station non-contention random access resource configuration; or
   when there is a non-contention random access resource configuration on the currently activated downlink BWP, and the currently activated uplink BWP is not the uplink BWP for non-contention random access corresponding to the currently activated downlink BWP, setting the active BWPs as the currently activated downlink BWP and the uplink BWP corresponding to the currently activated downlink BWP in the base station non-contention random access resource configuration.

10. The non-transitory computer readable storage medium according to claim 9, wherein,
    the current uplink and downlink BWPs include: currently activated uplink and downlink BWPs, or changed uplink and downlink BWPs based on BWP change signaling, or changed uplink and downlink BWPs based on expiration of a BWP inactivity timer;
    the current uplink and downlink BWPs being inconsistent with the uplink and downlink BWPs configured by the base station for non-contention random access, includes: the current uplink BWP is the same as the uplink BWP configured by the base station, the current downlink BWP is different from the downlink BWP configured by the base station; or
    the current downlink BWP is the same as the downlink BWP configured by the base station, the current uplink BWP is different from the uplink BWP configured by the base station.

11. The non-transitory computer readable storage medium according to claim 9, wherein, the processor executes the programs to further implement the following steps:
    receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or
    under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or
    when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

12. The non-transitory computer readable storage medium according to claim 10, wherein, the processor executes the programs to further implement the following steps:

receiving a BWP change command for changing the downlink BWP or changing the uplink BWP sent by the base station; changing the BWPs according to the BWP change command, determining the changed active BWPs, and if the numbers of the active uplink and downlink BWPs are different, setting the active BWPs as the currently activated uplink BWP and a downlink BWP with the same number as the currently activated uplink BWP; or under the condition that the BWP inactivity timer expires, after the downlink BWP is change to a default downlink BWP or an initial downlink BWP, if the numbers of the active uplink and downlink BWPs are different, setting the active BWPs as the currently activated uplink BWP and a downlink BWP with the same number as the currently activated uplink BWP; or when there is a non-contention random access resource configuration on the currently activated uplink BWP, and the currently activated downlink BWP is not a downlink BWP for non-contention random access corresponding to the currently activated uplink BWP, if the numbers of the active uplink and downlink BWPs are different, setting the active BWPs as the currently activated uplink BWP and a downlink BWP with the same number as the currently activated uplink BWP.

* * * * *